July 21, 1964 G. STRADELLA 3,141,208
LOCKING DEVICE FOR PRESSURE RING
Filed May 19, 1961
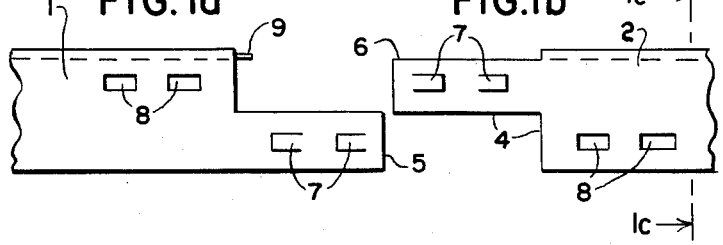
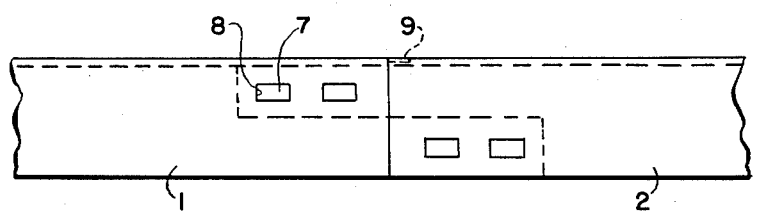
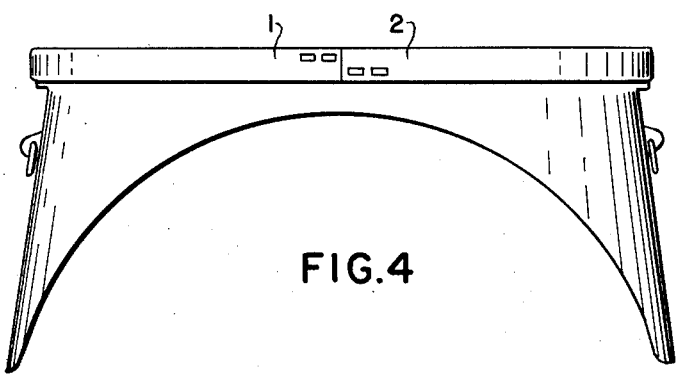
*INVENTOR.*
Giuseppe Stradella
by Maxwell E. Sparrow
ATTORNEY

United States Patent Office 3,141,208
Patented July 21, 1964

3,141,208
LOCKING DEVICE FOR PRESSURE RING
Giuseppe Stradella, Via Roma 9, Genoa-Recco, Italy
Filed May 19, 1961, Ser. No. 127,411
Claims priority, application Italy May 20, 1960
3 Claims. (Cl. 24—20)

The present invention relates to a simplified locking device which is particularly adapted for closing pressure-tight rings and the like rings or collars.

The principal advantage of the present invention consists in that the connection of the two ends of the ring which is to be closed is made without using auxiliary means such as screws, pins, etc., in order to obtain a considerable economy of material and labour in case of mass production of pressure rings and the like for securing particular members. These pressure rings are most commonly used for securing rigid members onto bodies of rubber or other resilient material such as, for example, windows or filters onto safety-masks for the protection of the face.

Masks of the single window type for underwater fishing are frequently used, and in this case it is necessary to obtain a watertight locking of the window onto the body of rubber or plastic material which forms the portion designed to fit over the face of the wearer. Heretofore, said locking has been effected by means of a metal ring formed by a plain or shaped metal strip having the two ends thereof bent at right angles and provided with a hole for inserting of a locking screw. This type of connection of the two ends of the locking ring had the disadvantage of the angular projections and of a poor appearance, and it also was relatively expensive in that it required the application of a screw, which required a certain amount of labour. Further, since the connecting right-angular members must hold in this case against the pull of the locking screw, the entire ring had to be made of a relatively thick and strong material. In order to overcome the above mentioned defects, a particular connecting system has been designed which is satisfactory in every respect, that is, that it is aesthetic because it has no angular projection, it is simple, because it needs no screw or any other connecting means, and it is economical, because it can be made of a material of minimum cross-section without the need of over-dimensioning which has been heretofore required by conventional systems.

Generally, according to the invention, the two ends of the pressure ring which have to be connected, are irregularly cut, that is, each has a lug which is offset and not overlapping the opposed lug, each lug having at least a ratchet tooth, or detent dog, which is formed by cutting and bending the ring-forming material itself, at least a slot being punched in a suitable location through each one of the ends to be connected, the arrangement being such that upon joining of the two ends of the ring, so that each of said lugs engage the lower surface of the opposed end of the ring to be connected, the teeth projecting upwards from each of said lugs snap into said slots, respectively, in order to connect the two ends of the ring without forming projections or any other roughness, whereby this connection is very simple, adapted to be readily made and almost invisible.

An embodiment of the present invention is shown, by way of example and not in a limiting sense, in the enclosed drawing, wherein:

FIG. 1a is a plan view of one end of the pressure ring.
FIG. 1b is a plan view of the other end of the pressure ring.
FIG. 1c is a cross section of the pressure ring.
FIG. 2a is a side view of FIG. 1a.
FIG. 2b is a side view of FIG. 1b.
FIG. 3 is a plan view of the pressure ring of FIGS. 1a and 1b after the ends have been connected with each other;
FIG. 4 is a view of a mask for underwater fishing, wherein the window is secured onto the rubber or plastic body of the mask by means of a ring which is closed by a locking device according to the invention.

As clearly shown in the figures, the two end portions 1, 2 of the pressure ring according to this illustrative embodiment, are each provided with a right angle cut 3, 4 on opposite sides, in order to reduce over a given length the width of the ring to about one half. Two opposite connecting lugs 5, 6 are thus formed. As shown in FIG. 2, the lugs 5, 6 are bent in an S-shaped manner at the bases thereof in order to permit a perfect offset overlap upon connection of the two end portions, this feature being further referred to hereinafter. Each lug is provided at least with a ratchet tooth 7 which is preferably formed from the strip material of the ring by making a U-shaped cut in the strip and then bending it outwards in order to obtain an outward protrusion at least corresponding to the thickness of said strip.

At a suitable position on the opposite side of each end portion one or more slots 8 are cut in register with the ratchet tooth or teeth 7 and adapted to receive the latter. Each tooth 7, as shown in FIG. 2, projects with the apex thereof towards the body of the ring after connecting the two end portions. To make the connection it is just necessary to approach and abut the two end portions to each other so that the two lugs be covered, as shown in FIG. 3.

Since the clamped body exerts an outwardly directed pressure to the inside of the ring, the ratchet teeth 7, once in register with the respective slots 8, are pushed thereinto and are kept engaged therein, thus preventing the ring from opening. This locking device is perfectly smooth on the surface and reliable. If it is desired, it can be disconnected by pressing the ring in the closing direction and by disengaging the teeth 7 from the slots 8 by means of a screw-driver or other suitable means.

According to the present invention, in order to achieve a still more firm connection, a projection 9 may be left on one of the end portions to be connected, and particularly on the shorter side of the right-angle cut 3, which projection is adapted to engage the opposed end to be connected therewith.

FIG. 4 shows a mask for underwater fishing having a window which forms a watertight connection with the front portion thereof by means of a locking ring the ends of which are connected according to the present invention.

The ring may be made of material of any suitable shape, and the ratchet teeth 7 and slots 8 may be of any suitable configuration and in any number, in order to obtain a closure which can be set in various positions, that is, with various diameters and pressures. Further, according to this invention, the number of connecting lugs 5, 6 may be increased by suitably cutting the end portion of the ring. Also, the end portions may be made with corresponding offset cuts adjacent the bases of the lugs without removing the portion of material from the angle 3, 4.

Although the present invention may be embodied substantially as herein shown and described, many modifications and changes may be made without departing from the fundamental principles of the invention, which has as its object to provide a connection or locking device for pressure rings or the like which can be performed without auxiliary means such as screws, rivets, etc. and yet is adapted to be opened in case of necessity without any detriment to the strength of the locking.

I claim:
1. A simplified locking device for locking a discontinuous, tight pressure ring made of plain strip material, said ring having two ends, comprising: lugs on said ends, said lugs being cut at right angles, reducing the width of said strip material to one-half of the original width thereof within the area of said lugs, said lugs on said ends being oppositely offset materially not interfering with one another, said lugs engaging the undersurface of the corresponding opposite ends of said ring, at least one ratchet tooth on each one of said lugs, and holes punched in the areas behind said right angle cuts, corresponding to said ratchet tooth so that said ratchet teeth may snap into said holes upon closing said ring, forming a closure of said ring presenting a smooth, plane surface.

2. A simplified locking device for locking a discontinuous, tight pressure ring according to claim 1, said ratchet teeth on said lugs consisting of portions of said material of said ring, said portions forming partially cutout and bent protrusions substantially equal to the thickness of said material of said ring.

3. A simplified locking device for locking a discontinuous, tight pressure ring according to claim 1, one of said ends having a projection preferably on the shorter side of said right-angle cut, said projection arranged for engaging the opposite end of said ring.

References Cited in the file of this patent

UNITED STATES PATENTS

| | | |
|---|---|---|
| 6,647 | Pratt | Aug. 14, 1849 |
| 169,789 | Drake | Nov. 9, 1875 |
| 410,446 | Rich | Sept. 3, 1889 |
| 410,447 | Rich | Sept. 3, 1889 |
| 995,691 | Latham | June 20, 1911 |
| 1,746,429 | Kelleweay | Feb. 11, 1930 |
| 2,003,918 | Brown | June 4, 1935 |
| 2,113,443 | Eggerss | Apr. 5, 1938 |
| 2,249,764 | Hothersall | July 22, 1941 |
| 2,262,758 | Erne | Nov. 18, 1941 |

FOREIGN PATENTS

| | | |
|---|---|---|
| 223,199 | Great Britain | Sept. 3, 1925 |